(12) United States Patent
Li et al.

(10) Patent No.: US 7,342,781 B2
(45) Date of Patent: Mar. 11, 2008

(54) MOUNTING APPARATUS FOR STORAGE DEVICE

(75) Inventors: Ding-Fang Li, Shenzhen (CN); Yang-Ming Lin, Shenzhen (CN)

(73) Assignees: Hong Fu Jin Precision Industry (Shenzen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 69 days.

(21) Appl. No.: 11/315,883

(22) Filed: Dec. 21, 2005

(65) Prior Publication Data

US 2006/0139872 A1    Jun. 29, 2006

(30) Foreign Application Priority Data

Dec. 25, 2004  (CN) .................. 2004 2 0103508 U

(51) Int. Cl.
*H05K 7/00* (2006.01)

(52) U.S. Cl. .................................................... 361/685

(58) Field of Classification Search ................ 361/685, 361/97.01, 724–727
See application file for complete search history.

(56) References Cited

U.S. PATENT DOCUMENTS

| 5,262,923 | A | 11/1993 | Batta et al. |
| 5,599,080 | A | 2/1997 | Ho |
| 5,683,159 | A | 11/1997 | Johnson |
| 7,198,338 | B2* | 4/2007 | Liu et al. .................. 312/223.1 |
| 7,204,469 | B2* | 4/2007 | Chen et al. .................. 248/694 |
| 2005/0007734 | A1* | 1/2005 | Peng et al. .................. 361/685 |
| 2005/0063152 | A1* | 3/2005 | Chen et al. .................. 361/685 |

* cited by examiner

*Primary Examiner*—J. F. Duverne
(74) *Attorney, Agent, or Firm*—Morris Manning Martin LLP; Tim Tingkang Xia, Esq.

(57) ABSTRACT

A mounting apparatus includes a bracket (30), and a retainer (50) slidably attached to the bracket. The bracket is punched inwardly from a side panel (21) of an electronic device for receiving a storage device (1) therein. A frame (10) contains the storage device therein and includes a pair of posts extending from side plates thereof. The bracket includes a pair of opposite sidewalls (33) each defining a pair of sideways therein. The retainer includes a pair of wings (56) slidably attached to the sidewalls of the bracket. A catch (56) with a slopped edge (561) is formed in a rear portion of each of the wings. The posts of the frame slide in the sideways and engage the actuating portions of the catch to move the retainer away from the bracket. The storage device is securely mounted in the bracket, with the posts held by the catches.

20 Claims, 4 Drawing Sheets

MOUNTING APPARATUS FOR STORAGE DEVICE

BACKGROUND

1. Field of the Invention

The present invention relates to a mounting apparatus, and more particularly to a mounting apparatus for a storage device.

2. General Background

An electronic apparatus, such as a typical desktop computer, tower, server, and the like, usually include storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is always labor-intensive.

The installation of a hard disk drive in a computer typically involves use of screws to attach the hard disk drive to a bracket of a computer chassis. Usually, these screws are small enough making them difficult to manipulate and install. It is laborious and time-consuming to manually manipulate the screws. Additionally, because of their small size, the screws are easier to be dropped by an assembler into the computer. Some accidental damage will occur in the computer due to impact of these moving parts, and the like causes.

To address the aforementioned problems, a plurality of mounting apparatuses is invented to reduce the number of needed screws. For example, a pair of detachable rails is attached to opposite sides of a storage device with screws. The storage device slides into and is secured to a drive bracket. However, the screws have to be removed to detach the rails from the storage device before replacing the storage device.

What is desired, therefore, is a mounting apparatus which conveniently and securely holds a storage device in a bracket.

SUMMARY

An exemplary of the mounting apparatus includes a bracket, and a retainer slidably attached to the bracket. The bracket is punched inwardly from a side panel of an electronic device for receiving a storage device therein. A frame contains the storage device therein and includes a pair of posts extending from side plates thereof. The bracket includes a pair of opposite sidewalls each defining a pair of sideways therein. The retainer includes a pair of wings slidably attached to the sidewalls of the bracket. A catch with a slopped edge is formed in a rear portion of each of the wings. The posts of the frame slide in the sideways and engage the actuating portions of the catch to move the retainer away from the bracket. The storage device is securely mounted in the bracket, with the posts held by the catches.

Other advantages and novel features will become more apparent from the following detailed description of preferred embodiments when taken in conjunction with the accompanying drawings, in which:

DETAILED DESCRIPTION OF THE INVENTION

Figure 1:
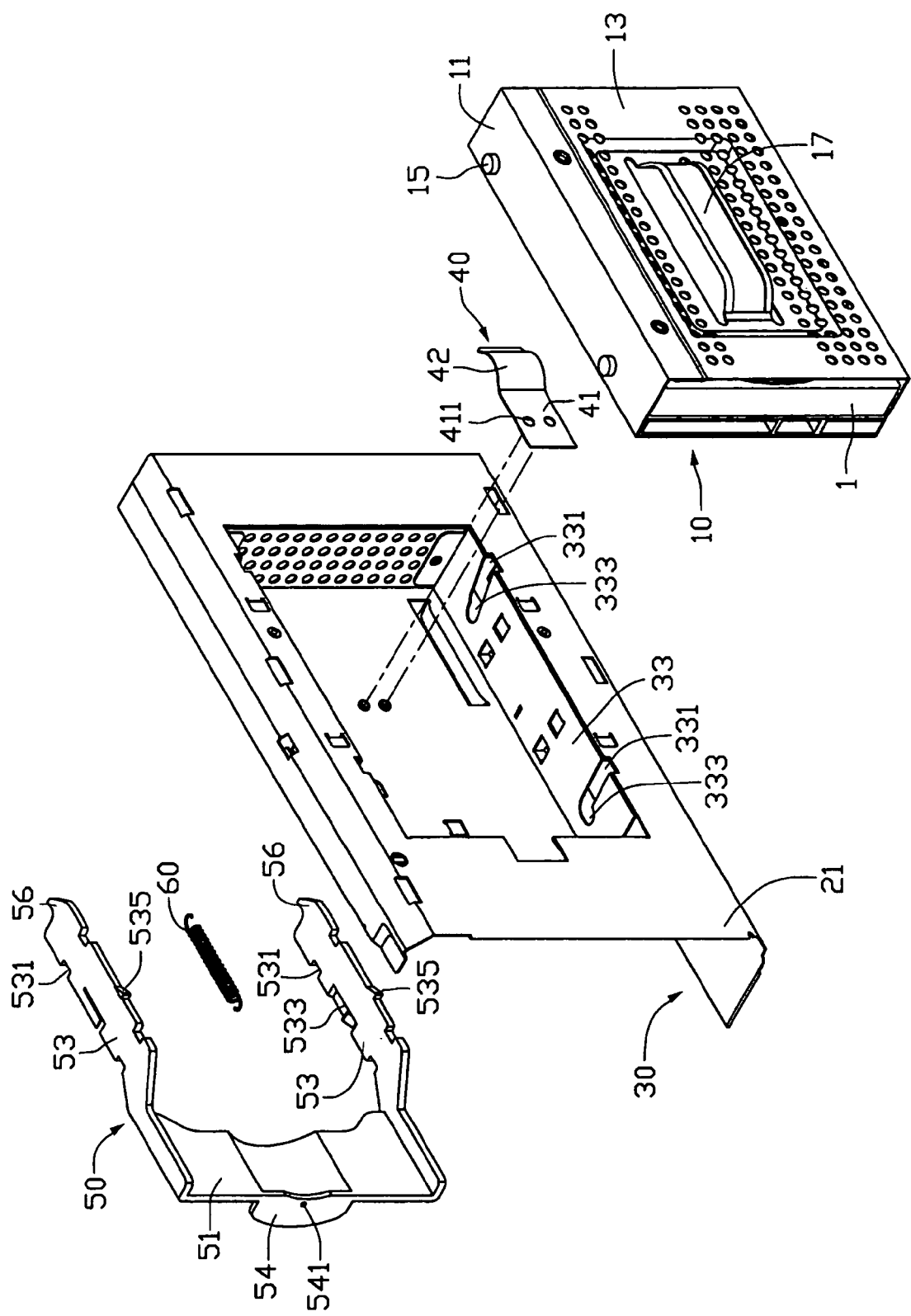
FIG. 1 is an exploded, isometric view of a mounting apparatus in accordance with a preferred embodiment of the present invention.

Referring to FIG. 1, in a preferred embodiment of the invention, a mounting apparatus of an electronic device like a computer is provided for holding a functional device like a storage device 1 of the computer in place. The mounting apparatus includes a bracket 30, and a retainer 50 slidably attached to the bracket 30 via a coil spring 60.

The storage device 1 is mounted in a frame 10. The frame 10 includes a pair of side plates 11, and an end wall 13 perpendicular to the side plates 11. A pair of posts 15 extends perpendicularly from each of the side plates 11. A handle 17 extrudes outwardly from the end wall 13.

Figure 2:
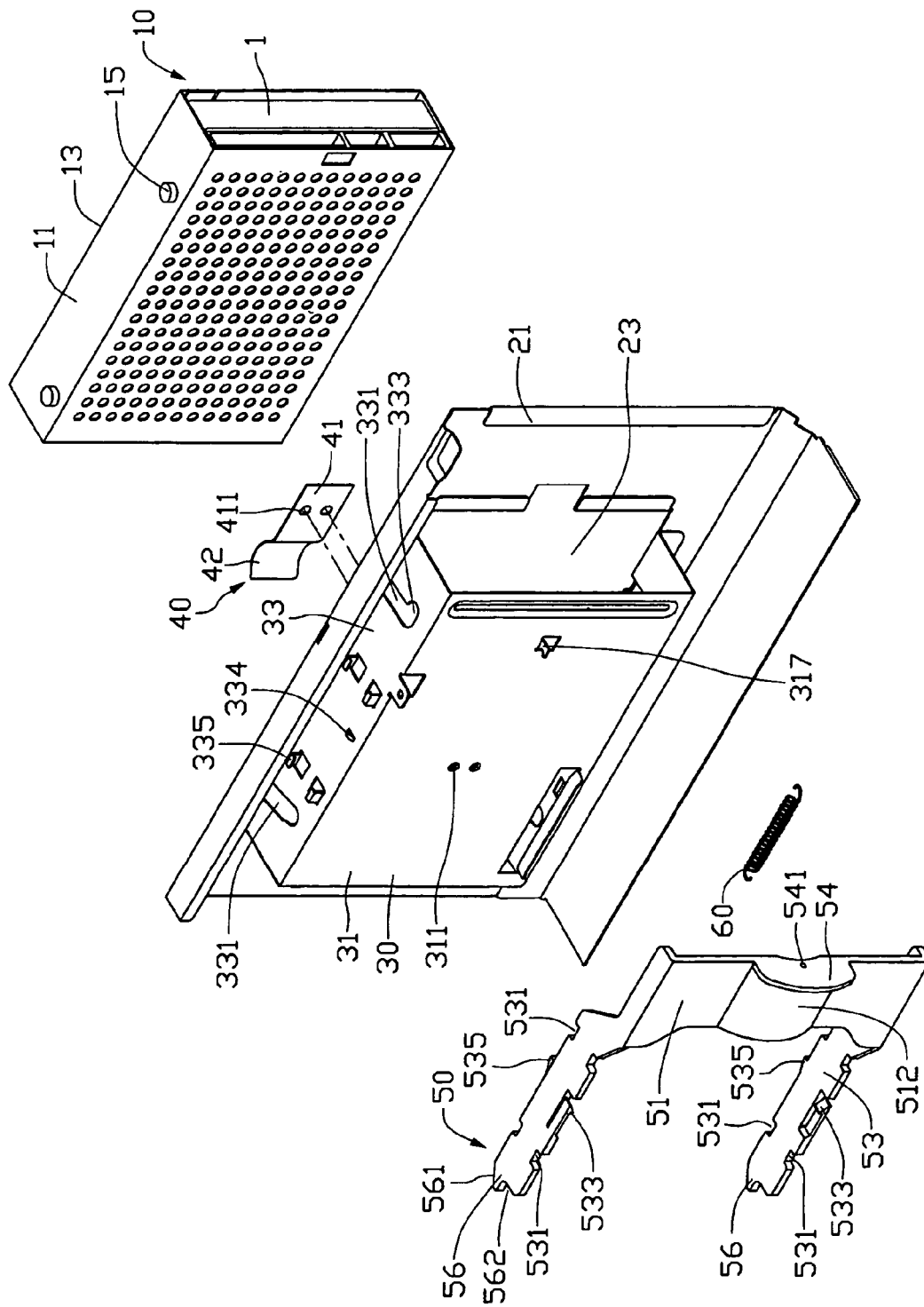
FIG. 2 is similar to FIG. 1, but viewed from another aspect.

Referring also to FIG. 2, the bracket 30 is punched inwardly from a side panel 21 of the electronic device. The bracket 30 includes a base wall 31, a pair of sidewalls 33 perpendicular to the base wall 31. A pair of first fixing holes 311 is defined in a middle portion of the base wall 31, for attaching a resilient tab 40 to an inner surface of the base wall 31. The resilient tab 40 includes a connecting portion 41, and a free portion 42. A pair of second fixing holes 411 is defined in the connecting portion 41, corresponding to the first fixing holes 311. A clasp 317 extends perpendicularly from an end portion of the base wall 31. A pair of sideways 331 is leanly defined in each of the sidewalls 33, corresponding to the posts 15 of frame 10. An enlarged recess 333 is defined in each of the sidewalls 33 at end of the corresponding slideway 331. Two sets of opposite L-shaped guiding tabs 335 with are punched outwardly from each of the sidewalls 33, between the sideways 331. Each set of the guiding tabs 335 faces oppositely. A block 334 extends outwardly from each of the sidewalls 33, between two sets of the guiding tabs 335.

The retainer 50 includes a body plate 51, and a pair of wings 53 extended perpendicularly and outwardly from upper and lower edges of the body plate 51 respectively. An operating tab 54 extends perpendicularly and inwardly from an end edge of the body plate 51. An arched portion 512 forms from a middle portion of the vertical wall 51, connecting with the operating tab 54. An aperture 541 is defined in the operating tab 54, together with the clasp 317 of the bracket 30 for attaching the coil spring 60 therebetween. A catch 56 is formed in a rear portion of each of the wings 54. Each of the catches includes an actuating portion 561, and a notch 562 defined therein. The actuating portion 561 is a sloped outer edge of the catch 56. A pair of cutouts 531 is defined in both opposite edge portions of each of the wings 53. A hook 533 extends perpendicularly and oppositely from an edge portion of each of the wings 53, between the corresponding cutouts 531. A locating bar 535 extends from another edge portion of each of the wings 53.

In assembly of the mounting apparatus, the retainer 50 is movably attached to the bracket 30. Two free ends of the coil spring 60 engage in the aperture 541 of the retainer 50 and the clasp 317 of the bracket 30 respectively. The coil spring 60 is shield by the arched portion 512 of the retainer 50. The wings 53 of the retainer 50 are slidably attached to the sidewalls 33 of the bracket 30, with the guiding tabs 335 aligning to the cutouts 541 and the locating bar 535 movably engages with the block 334 for prevent overmovement of the retainer 50 relative to the bracket 30. The resilient tab 40 is fixed to the inner surface of the base wall 31 of the bracket 30.

Figure 3:
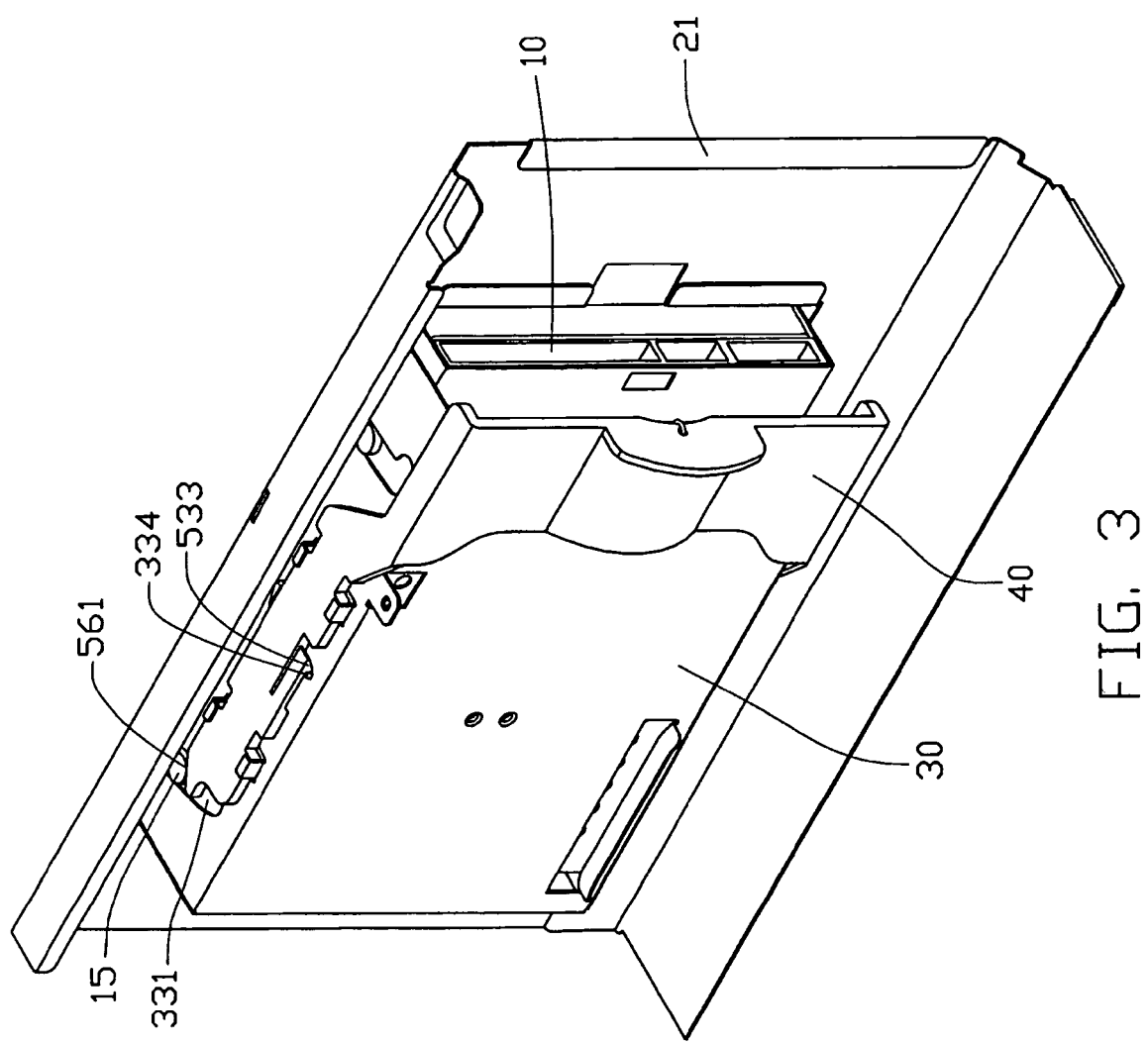
FIGS. 3 and 4 are assembled views of FIG. 2, respectively schematically showing the mounting apparatus in different working states.
Figure 4:
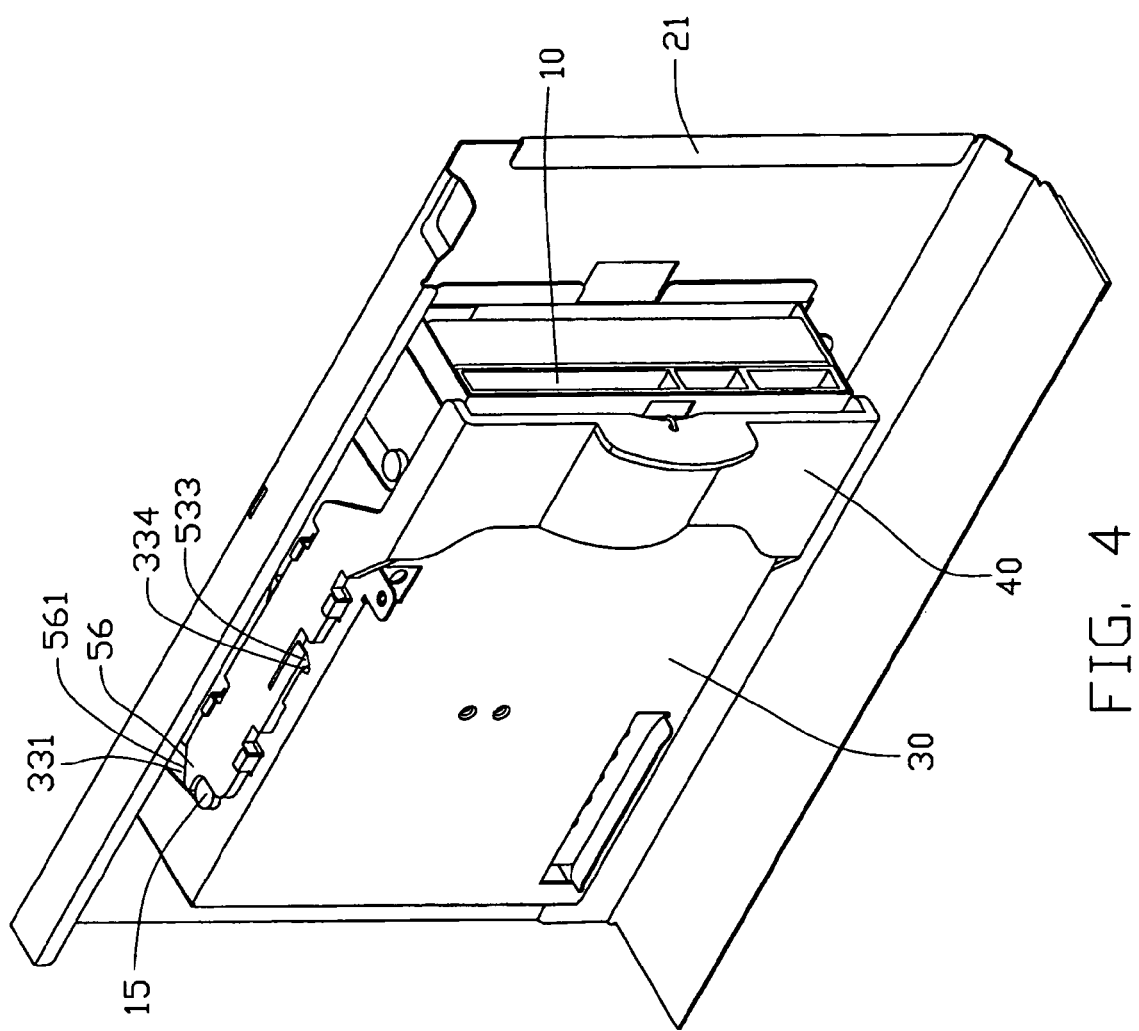

In use of the mounting apparatus, FIG. 3 shows the frame 10 together with the storage device 1 moved into the bracket 30, but not being fixed therein. The frame 10 is put into the bracket 30 by manipulating the handle 17 in a direction perpendicular to the base wall 31 of the bracket 30, with the posts 15 sliding into the sideways 332. The posts 15 abut the actuating portions 561 of the catches 56 to move the retainer 50 away from the bracket 30. At the same time, the coiling spring 60 is stretched. When the posts 15 ride over the actuating portions 561 and engage in the notches 562 of the retainer 50. The coil spring 60 is restored to move the retainer 50 toward the bracket 30 respectively in a direction parallel to the base wall 31 thereof. The free portion 42 of the resilient tab 40 is restored to move the frame 10 away from the bracket 30 in a direction perpendicular to the base wall 31 thereof. Thus, the frame 10 together with the storage device 1 is securely mounted in the bracket 30.

To detach the storage device 10, the operating tab 54 of the retainer 50 is drawn away from the bracket 30 to disengage the posts 15 away from the notches 562 of the catches 56. At the same time, the coil spring 60 is stretched again. Then the frame 10 can be easily withdrawn from the bracket 30 by manipulating the handle 17.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A mounting apparatus for a storage device, comprising:
   a frame for containing the storage device therein and comprising a pair of side plates each with a post extending outwardly therefrom;
   a bracket receiving the frame therein and comprising a pair of sidewalls each defining a slideway engaging with the corresponding post;
   a retainer movably attached to the bracket and comprising a pair of wings sliding along the sidewalls of the bracket in a direction parallel with the sidewalls, each of the wings comprising a catch engaging with the corresponding post to secure the frame in the bracket.

2. The mounting apparatus as claimed in claim 1, wherein the catch comprises an actuating portion, and a notch for holding the corresponding post.

3. The mounting apparatus as claimed in claim 2, wherein the actuating portion is a slopped edge of the catch.

4. The mounting apparatus as claimed in claim 1, wherein the bracket further comprises a base wall perpendicular to the sidewalls thereof.

5. The mounting apparatus as claimed in claim 4, wherein the frame comprises a handle extending outwardly therefrom, the frame is put into the bracket in a direction perpendicular to the base wall by gripping the handle.

6. The mounting apparatus as claimed in claim 4, wherein a resilient tab is attached to an inner surface of the base wall of the bracket.

7. The mounting apparatus as claimed in claim 4, wherein a coil spring attaches the retainer to the bracket.

8. The mounting apparatus as claimed in claim 7, wherein the retainer further comprises a body plate perpendicular to the wings thereof, a clasp extends from the base wall of the bracket, an operating tab extends from the body plate and defining an aperture therein, two free ends of the coil spring engage in the aperture of the retainer and the clasp respectively.

9. The mounting apparatus as claimed in claim 1, wherein the sideways are leanly defined in the sidewalls of the bracket.

10. The mounting apparatus as claimed in claim 1, wherein a locating bar extends from each of the wings, a block extends outwardly from each of the sidewalls, for engaging with the corresponding locating bar.

11. The mounting apparatus as claimed in claim 1, wherein at least one cutout is defined in each of the wings of the retainer, at least one set of opposite guiding tabs extend from each of the sidewalls of the bracket, for engaging said cutout.

12. The mounting apparatus as claimed in claim 11, wherein a hook extends perpendicularly from each of the wings and engages said set of guiding tabs.

13. A mounting apparatus assembly comprising:
    a bracket comprising a base wall, and at least one sidewall defining at least one slideway;
    a storage device having at least one post formed at a side thereof and placed into the bracket along a direction perpendicular to the base wall, said post sliding in said slideway; and
    a retainer attached to the bracket and sliding in a direction parallel to the base wall of the bracket, the retainer comprising at least one wing sliding along said sidewall of the bracket in a direction parallel with the sidewall, said wing comprising at least one catch engaging with said post to secure the storage device in the bracket.

14. The mounting apparatus assembly as claimed in claim 13, wherein said catch comprises an actuating portion, and a notch for holding said post.

15. The mounting apparatus assembly as claimed in claim 14, wherein the actuating portion is a slopped edge of said catch.

16. The mounting apparatus assembly as claimed in claim 13, wherein a resilient tab is attached to an inner surface of the base wall of the bracket.

17. The mounting apparatus assembly as claimed in claim 13, wherein said slideway is leanly defined in said sidewall of the bracket.

18. The mounting apparatus assembly as claimed in claim 13, wherein a locating bar extends from said wing, a block extends outwardly from said sidewall, engaging with the locating bar.

19. An electronic device comprising:
    a side panel of said electronic device defining a bracket extending from an outline of said electronic device into said electronic device so as to provide a space therein;
    a functional component removably installable in said space of said bracket and capable of entering said bracket from said outline of said electronic device; and
    a retainer movably attachable to said bracket and capable of retaining said functional component in said space of said bracket by means of sliding in a direction parallel with a sidewall of said bracket to engage with at least two sides of said functional component when said functional component resides in said space of said bracket.

20. The electronic device as claimed in claim 19, wherein said retainer comprises at least two wings extending correspondingly toward said at least two sides of said functional component residing in said space of said bracket so as to engage with said at least two sides of said functional component respectively, and an operating tab of said retainer is formed beside said at least two wings so as to commonly control engagement of said at least two wings with said at least two sides of said functional component.

* * * * *